(12) United States Patent
Hori et al.

(10) Patent No.: US 11,173,951 B2
(45) Date of Patent: Nov. 16, 2021

(54) ELECTRIC POWER STEERING DEVICE AND CONTROL METHOD THEREFOR

(71) Applicant: Mitsubishi Electric Corporation, Tokyo (JP)

(72) Inventors: Yasuaki Hori, Kobe (JP); Kenta Kawahara, Kobe (JP); Katsuya Ikemoto, Tokyo (JP); Eiji Iwami, Tokyo (JP); Hideki Doi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 16/641,764

(22) PCT Filed: Nov. 6, 2017

(86) PCT No.: PCT/JP2017/039981
§ 371 (c)(1),
(2) Date: Feb. 25, 2020

(87) PCT Pub. No.: WO2019/087402
PCT Pub. Date: May 9, 2019

(65) Prior Publication Data
US 2020/0391786 A1 Dec. 17, 2020

(51) Int. Cl.
| B62D 5/04 | (2006.01) |
| B62D 15/02 | (2006.01) |
| B62D 6/00 | (2006.01) |
| B62D 6/02 | (2006.01) |

(52) U.S. Cl.
CPC ......... *B62D 5/0463* (2013.01); *B62D 5/0481* (2013.01); *B62D 6/00* (2013.01); *B62D 6/02* (2013.01); *B62D 15/021* (2013.01)

(58) Field of Classification Search
CPC ...... B62D 5/0463; B62D 5/0481; B62D 6/00; B62D 6/02; B62D 15/021
See application file for complete search history.

(56) References Cited

FOREIGN PATENT DOCUMENTS

| JP | 8-91236 A | 4/1996 |
| JP | 4134646 B2 | 6/2008 |

*Primary Examiner* — Mathew Franklin Gordon
(74) *Attorney, Agent, or Firm* — Sughrue Mion, PLLC; Richard C. Turner

(57) ABSTRACT

Provided is an electric power steering device including a phase compensation unit having a desirable phase compensation characteristic for each vehicle speed region, which suppresses deterioration in stability of a steering system in a case where the phase compensation characteristic is changed to a different phase compensation characteristic, in which the phase compensation unit includes: a plurality of phase compensation calculation units configured to execute phase compensation calculation based on each phase compensation characteristic; a phase compensation characteristic determination unit configured to determine a phase compensation characteristic based on a vehicle speed signal output from a vehicle speed sensor; and a selection unit configured to select a phase-compensated torque signal output by the phase compensation unit from phase compensation calculation results output by the plurality of phase compensation calculation units in consideration of an amount of change in phase compensation calculation result at a time of switching the phase compensation characteristic.

8 Claims, 13 Drawing Sheets

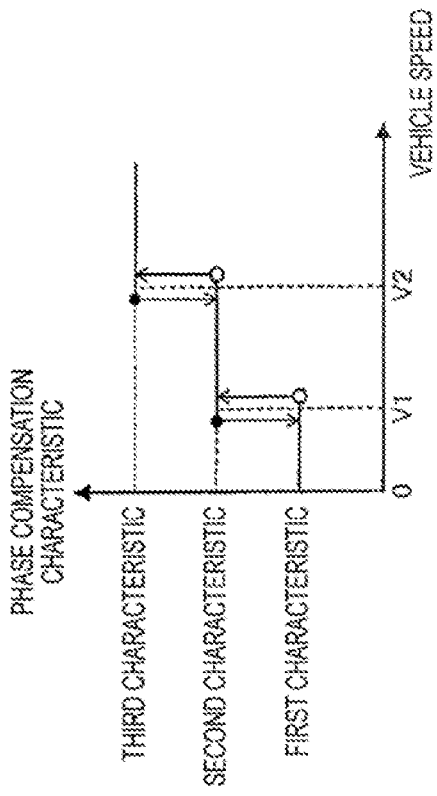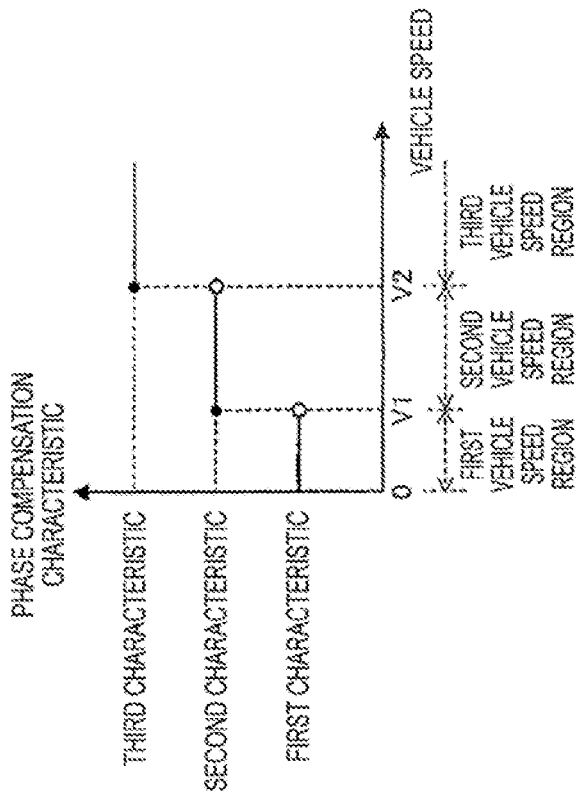

FIG. 7

| No. | INPUT SIGNAL | | DETERMINATION RESULT | CHANGE OF PHASE COMPENSATION CHARACTERISTIC |
|---|---|---|---|---|
| | PREVIOUS SELECTED CHARACTERISTIC SLOPE ΔTIPO.n-1 | DETERMINED CHARACTERISTIC SLOPE ΔTIPI | | |
| 1 | POSITIVE VALUE (SIGN: +) | POSITIVE VALUE (SIGN: +) | NO | CHANGE |
| 2 | | NEGATIVE VALUE (SIGN: -) | YES | AVOID CHANGING |
| 3 | | ZERO | NO | CHANGE |
| 4 | NEGATIVE VALUE (SIGN: -) | POSITIVE VALUE (SIGN: +) | YES | AVOID CHANGING |
| 5 | | NEGATIVE VALUE (SIGN: -) | NO | CHANGE |
| 6 | | ZERO | | |
| 7 | ZERO | POSITIVE VALUE (SIGN: +) | | |
| 8 | | NEGATIVE VALUE (SIGN: -) | | |
| 9 | | ZERO | | |

ELECTRIC POWER STEERING DEVICE AND CONTROL METHOD THEREFOR

TECHNICAL FIELD

The present invention relates to an electric power steering device to be mounted on a vehicle, and a control method therefor, and more particularly, to suppression of vibration of a steering wheel.

BACKGROUND ART

It is widely known that an electric power steering device uses a torque sensor to detect a steering torque added to a steering wheel by a driver of a vehicle. Then, the electric power steering device causes a motor to generate a drive torque corresponding to the detected steering torque, and adds the drive torque of the motor to a steering mechanism of the vehicle. As a result, it is possible to assist the driver in an operation of the steering wheel.

In general, an electric power steering device is configured to add a phase delay or phase lead corresponding to a vehicle speed to a torque signal received from the torque sensor, to thereby adjust a gain.

A related-art control device for electric power steering disclosed in Patent Literature 1 can use a phase compensation processing unit, which is executed by software processing, to variably set a gain in accordance with a vehicle speed received from a vehicle speed sensor. This control is mainly executed by a vehicle speed adaptive gain setting unit.

In Patent Literature 1, an example of a characteristic of the vehicle speed adaptive gain is given. In Patent Literature 1, the vehicle speed adaptive gain is set to be GV1 when the vehicle speed is zero or is in a very low speed region. In Patent Literature 1, the vehicle speed adaptive gain is set to be GV2 when the vehicle speed is in a vehicle speed region of a vehicle speed threshold value Vth or more. Further, in Patent Literature 1, the vehicle speed adaptive gain is monotonously increased as the vehicle speed becomes larger between the vehicle speed adaptive gain GV1 and the vehicle speed adaptive gain GV2, to thereby gradually change the vehicle speed adaptive gain from GV1 to GV2.

A related-art control device for electric power steering disclosed in Patent Literature 2 includes phase compensation means constructed by software, and supplies phase compensation calculation means with a constant corresponding to a vehicle speed signal received from a vehicle speed sensor.

CITATION LIST

Patent Literature
  [PTL 1] JP 4134646 B2
  [PTL 2] JP H8-91236 A

SUMMARY OF INVENTION

Technical Problem

In such an electric power steering device, in order to suppress vibration of a steering wheel that is caused in a specific vehicle speed region, a specific phase compensation characteristic different from those of previous and subsequent vehicle speed regions is applied to a vehicle speed region in which vibration is caused. However, with such control, an expected phase compensation effect cannot be obtained even when the phase compensation characteristic is changed, resulting in a problem in that an adverse effect such as vibration or impact is given to behavior of the steering wheel.

The reason is as described below. The phase compensation calculation unit outputs a current phase compensation calculation result based on a current input value including, for example, a torque value, and a previous phase compensation calculation result. Thus, when a parameter value (phase compensation characteristic) to be applied to phase compensation calculation is switched in accordance with the vehicle speed, there is an influence of the phase compensation calculation result obtained before the parameter value is switched, with the result that an expected phase compensation calculation result cannot be obtained.

Specifically, the phase compensation calculation unit calculates the current phase compensation calculation result by predefined calculation based on: the previous phase compensation calculation result, which is based on a parameter value for a low speed region; and the current phase compensation calculation result, which is based on, for example, a torque value being the current input value, and a parameter value for a medium speed region. Thus, the phase compensation calculation unit uses values that are based on different parameter values. As a result, the torque added by the steering wheel may abruptly change to cause vibration or impact in the steering wheel.

The present invention has been made to solve the above-mentioned problem, and has an object to provide an electric power steering device and a control method therefor, which suppress deterioration in stability of a steering system in a case where a phase compensation characteristic is changed to a different phase compensation characteristic in accordance with a vehicle speed.

Solution to Problem

According to one embodiment of the present invention, there is provided an electric power steering device, including: a torque sensor configured to detect a steering torque added to a steering system of a vehicle by a driver, and output a torque signal; a vehicle speed sensor configured to detect a vehicle speed of the vehicle, and output a vehicle speed signal; a motor, which is coupled to the steering system, and is configured to generate an assist torque for assisting the driver in steering and add the assist torque to the steering system; and a control device configured to control drive of the motor so that the motor generates the assist torque corresponding to the torque signal and the vehicle speed signal, in which the control device includes a phase compensation unit configured to compensate for a phase of the torque signal in accordance with the vehicle speed signal, and is configured to generate a motor current control signal in accordance with a phase-compensated torque signal after phase compensation, in which the phase compensation unit includes: a storage unit configured to store a plurality of phase compensation characteristics corresponding to a plurality of vehicle speed regions; a plurality of phase compensation calculation units configured to execute phase compensation calculation by the mutually different plurality of phase compensation characteristics for the torque signal, and output phase compensation calculation results; a phase compensation characteristic determination unit configured to determine a phase compensation characteristic corresponding to a vehicle speed region including the vehicle speed signal from among the plurality of phase compensation characteristics, and output the phase compensation characteristic as a characteristic determination result; and a selection unit configured to select, as the phase-compensated torque signal, a phase compensation calculation result corresponding to the characteristic determination result from among the phase compensation calculation results respectively calculated by the plurality of phase compensation calculation units, and output the phase compensation calculation result, and in which the selection unit has at least one of: a configuration to: store a selected characteristic indicating a phase compensation characteristic corresponding to the previously selected phase-compensated torque signal; select, as the phase-compensated torque signal, a phase compensation calculation result corresponding to the characteristic determination result when the characteristic determination result output by the phase compensation characteristic determination unit as a current value and the selected characteristic are as the same as each other; calculate a difference between a current phase compensation calculation result corresponding to the characteristic determination result and a current phase compensation calculation result corresponding to the selected characteristic when the characteristic determination result output by the phase compensation characteristic determination unit as the current value and the selected characteristic are not the same as each other; select, as the phase-compensated torque signal, the current phase compensation calculation result corresponding to the characteristic determination result when the difference falls within an allowable range set in advance; and select, as the phase-compensated torque signal, the current phase compensation calculation result corresponding to the selected characteristic when the difference falls outside the allowable range; or a configuration to: store a selected characteristic indicating a phase compensation characteristic corresponding to the previously selected phase-compensated torque signal; select, as the phase-compensated torque signal, a phase compensation calculation result corresponding to the characteristic determination result when the characteristic determination result output by the phase compensation characteristic determination unit as the current value and the selected characteristic are as the same as each other; determine whether a rotation state of the steering system falls within a low frequency region when the characteristic determination result output by the phase compensation characteristic determination unit as the current value and the selected characteristic are not the same as each other; select, as the phase-compensated torque signal, the current phase compensation calculation result corresponding to the characteristic determination result when the rotation state of the steering system falls within the low frequency region; and select, as the phase-compensated torque signal, the current phase compensation calculation result corresponding to the selected characteristic when the rotation state of the steering system does not fall within the low frequency region.

Advantageous Effects of Invention

According to the present invention, there is provided an effect of suppressing deterioration in stability of the steering system due to change of the phase compensation characteristic by determining the phase compensation calculation result to be applied in consideration of at least one of the change of the phase compensation calculation result between before and after the change of the phase compensation characteristic or the rotation state of the steering system.

BRIEF DESCRIPTION OF DRAWINGS

FIGS. 2A and 2B are graphs for showing an example of a phase compensation characteristic to be used by a phase compensation unit in the first embodiment of the present invention.

FIG. 7 is a table for showing an example of a determination method of Step S21 of FIG. 6.

DESCRIPTION OF EMBODIMENTS

Now, an electric power steering device and a control method therefor according to each of embodiments of the present invention are described with reference to the drawings. Note that, in each of the embodiments, the same or corresponding portions are denoted by the same reference symbols, and the overlapping description thereof is omitted.

In first and second embodiments of the present invention, change of a phase compensation calculation result to be applied is determined in consideration of change of the phase compensation calculation result between before and after change. In third and fourth embodiments of the present invention, a rotation state of a steering system is determined to be in a low frequency region like steering by a driver based on a rotation state of a rotation axis AX of the steering system, and change of the phase compensation calculation result to be applied is determined.

First Embodiment

Now, a description is given of a first embodiment of the present invention with reference to FIG. 1 to FIG. 4.

Figure 1:
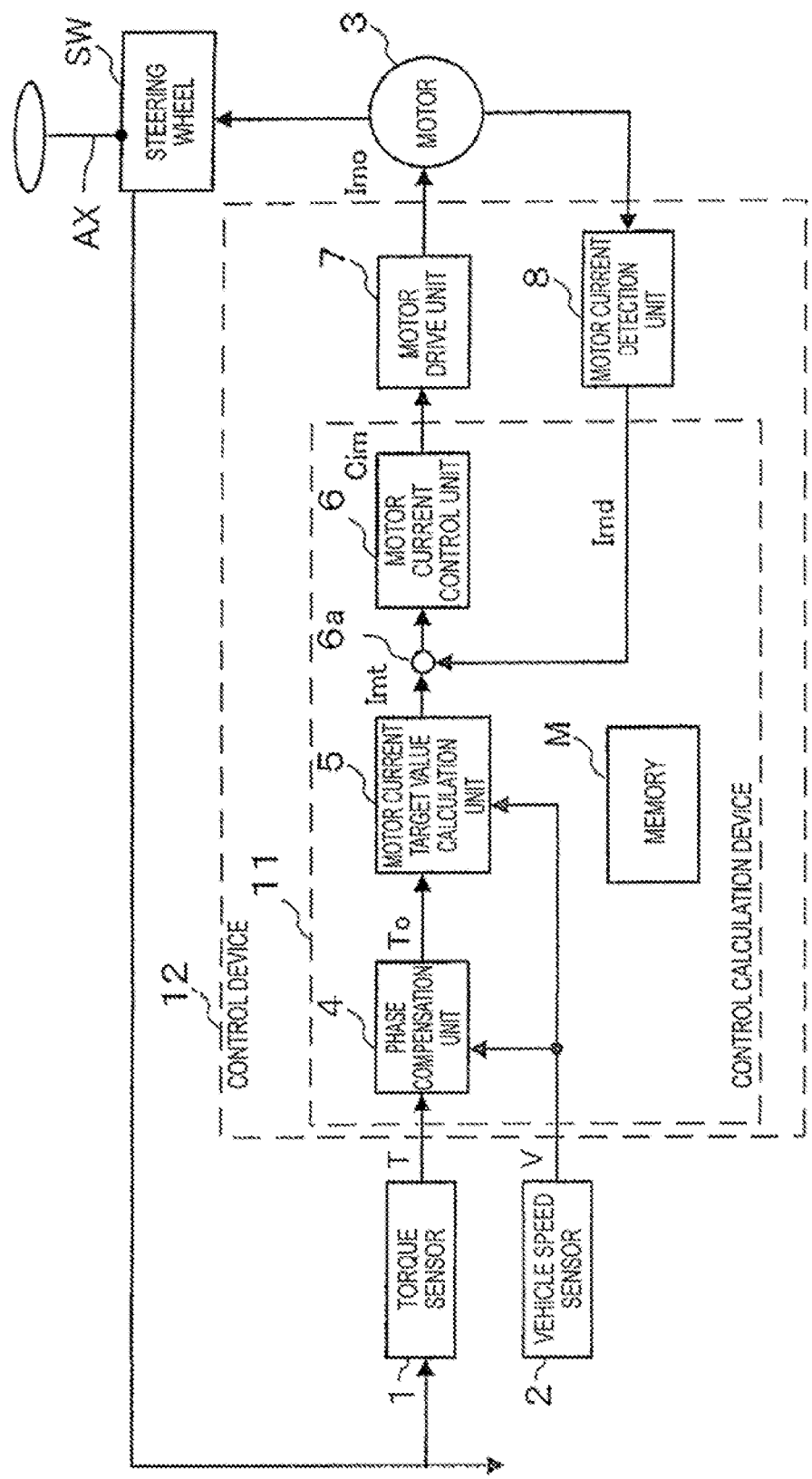
FIG. 1 is a functional block diagram for illustrating a configuration of an electric power steering device according to a first embodiment of the present invention.

FIG. 1 is a functional block diagram for illustrating a configuration of an electric power steering device according to the first embodiment of the present invention. A torque sensor 1 detects a steering torque added to a steering wheel SW being a steering mechanism of a vehicle by a driver of the vehicle, and outputs a torque signal T. A vehicle speed sensor 2 detects a traveling speed of the vehicle, and outputs a vehicle speed signal V.

A motor 3 is controlled by a control device 12 of the electric power steering device based on an input signal including the torque signal T from the torque sensor 1, and outputs an assist torque to be added to the steering mechanism. The control device 12 of the electric power steering device includes a control calculation device 11 formed of a computer, a motor drive unit 7 constructed by an electronic circuit, and a motor current detection unit 8 constructed by an electronic circuit.

The control calculation device 11 includes a phase compensation unit 4, a motor current target value calculation unit 5, and a motor current control unit 6, and those components are each constructed by software.

The phase compensation unit 4 constructed by software described later compensates for the phase of the torque signal T from the torque sensor 1 in order to improve the responsiveness and stability of the entire steering system. In the steering system, for example, a detection signal including a signal indicating a steering torque added to the steering wheel SW by the driver is fed back to the control device 12. Then, the control device 12 controls the motor 3 in accordance with the fed back signal, and the motor 3 adds an assist torque to the steering wheel SW, to thereby form a closed-loop control system. The phase compensation unit 4 is configured to change the phase compensation characteristic based on the vehicle speed signal V from the vehicle speed sensor 2. Then, the phase compensation unit 4 outputs a torque signal To after phase compensation, which is obtained by compensating for the phase of the torque signal T from the torque sensor 1. The torque signal To after phase compensation is also referred to as "phase-compensated torque signal".

The motor current target value calculation unit 5 calculates a target value Imt of a current to be supplied to the motor 3 based on the phase-compensated torque signal To from the phase compensation unit 4 and the vehicle speed signal V from the vehicle speed sensor 2. The motor current detection unit 8 detects a current of the motor 3. The motor current control unit 6 calculates and outputs a motor current control signal Cim for controlling a motor current Imo based on a value of comparison between a motor current target value Imt from the motor current target value calculation unit 5 and a motor current detection value Imd from the motor current detection unit 8, which is acquired by a comparator 6a. The motor drive unit 7 is formed of, for example, an inverter, and generates the motor current Imo to be supplied to the motor 3 based on the motor current control signal Cim calculated by the motor current control unit 6, to thereby drive the motor 3. The motor current control unit 6 may include the comparator 6a.

Next, an operation of the phase compensation unit 4 described above is described with reference to FIGS. 2 to FIG. 4.

The phase compensation unit 4 is configured to change the phase compensation characteristic based on the vehicle speed signal V from the vehicle speed sensor 2, and outputs the phase-compensated torque signal To, which is obtained by compensating for the phase of the torque signal T from the torque sensor 1.

FIG. 2A is a graph for showing an example of the phase compensation characteristic to be used for phase compensation by the phase compensation unit 4. In FIG. 2A, the vertical axis represents the phase compensation characteristic, and the horizontal axis represents the vehicle speed. A relationship between the vehicle speed and the phase compensation characteristic to be applied to phase compensation is shown in FIG. 2A. The phase compensation characteristic of FIG. 2A is a parameter in a case of using, for example, three phase compensation calculation units 41, 42, and 43 illustrated in FIG. 3, which are configured to execute phase compensation calculation by the same calculation method. As the phase compensation characteristic, parameter values corresponding to three vehicle speed regions, namely, first to third vehicle speed regions, are provided. The phase compensation characteristic of FIG. 2A is stored in advance in a memory M being a storage unit of the control calculation device 11 illustrated in FIG. 1, for example.

The vehicle speed regions are divided by V1 and V2, which are boundary vehicle speeds. In FIGS. 2A and 2B, black circles on lines of the boundary vehicle speeds V1 and V2 mean that the corresponding vehicle speeds are included. White circles mean that the corresponding vehicle speeds are not included. For example, regarding the second characteristic, the vehicle speed range to which the second characteristic is applied is "V1≤vehicle speed<V2" (including V1 but not including V2).

When the vehicle speed satisfies "0≤vehicle speed<V1", the vehicle speed region is set as "first vehicle speed region". The phase compensation characteristic to be applied to the first vehicle speed region is "first characteristic".

When the vehicle speed satisfies "V1≤vehicle speed<V2", the vehicle speed region is set as "second vehicle speed region". The phase compensation characteristic to be applied to the second vehicle speed region is "second characteristic".

When the vehicle speed is "V2≤vehicle speed", the vehicle speed region is set as "third vehicle speed region". The phase compensation characteristic to be applied to the third vehicle speed region is "third characteristic".

Although the description is based on the assumption that there are three vehicle speed regions, the number of vehicle speed regions is only required to be two or more. Further, although the phase compensation characteristic is set to be different for each vehicle speed region, the number of phase compensation characteristics is only required to be two or more. For example, the first vehicle speed region and the third vehicle speed region may be set to have the same first characteristic. The phase compensation characteristic is only required to be changed in accordance with the vehicle speed.

Further, in the example of FIG. 2A, the characteristic is switched by the same boundary vehicle speed in both of a case in which the vehicle speed increases and a case in which the vehicle speed decreases. In such a case, there may occur chattering in which a result of determination of the vehicle speed region frequently varies depending on variation of the vehicle speed near the boundary vehicle speed. In view of the above, as in the example of FIG. 2B, hysteresis may be exhibited at a switching point of the characteristic. That is, the boundary vehicle speed may be set separately for the case in which the vehicle speed increases and the case in which the vehicle speed decreases.

Next, a description is given of a configuration of the phase compensation unit 4.

Figure 3:
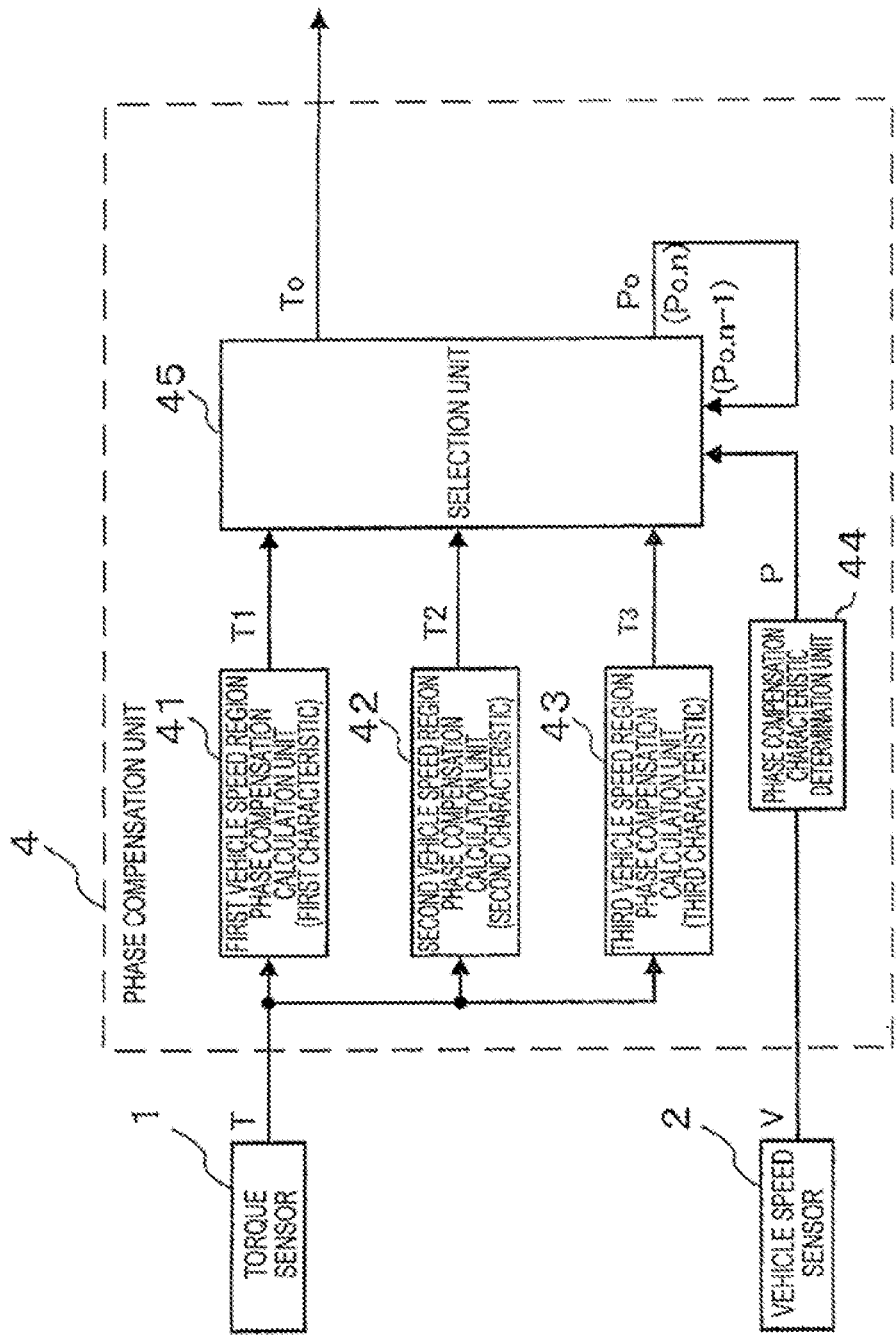
FIG. 3 is a functional block diagram for illustrating an example of a configuration of the phase compensation unit in the first embodiment of the present invention.

FIG. 3 is a functional block diagram for illustrating an example of the configuration of the phase compensation unit 4.

The first vehicle speed region phase compensation calculation unit 41 having the first characteristic, the second vehicle speed region phase compensation calculation unit 42 having the second characteristic, and the third vehicle speed region phase compensation calculation unit 43 having the third characteristic use the same phase compensation calculation method. The phase compensation calculation units 41, 42, and 43 execute phase compensation calculation by using respective parameter values of the first characteristic, the second characteristic, and the third characteristic shown in FIG. 2A. As a result, the phase compensation calculation units 41, 42, and 43 obtain phase-compensated calculation results T1, T2, and T3, which correspond to respective vehicle speed regions.

The first vehicle speed region phase compensation calculation unit 41 executes phase compensation calculation for the torque signal T from the torque sensor 1 based on the phase compensation characteristic of the first characteristic to be applied to the first vehicle speed region shown in FIG. 2A, and outputs a first vehicle speed region phase compensation calculation result T1.

The second vehicle speed region phase compensation calculation unit 42 executes phase compensation calculation for the torque signal T from the torque sensor 1 based on the phase compensation characteristic of the second characteristic to be applied to the second vehicle speed region shown in FIG. 2A, and outputs a second vehicle speed region phase compensation calculation result T2.

The third vehicle speed region phase compensation calculation unit 43 executes phase compensation calculation for the torque signal T from the torque sensor 1 based on the phase compensation characteristic of the third characteristic to be applied to the third vehicle speed region shown in FIG. 2A, and outputs a third vehicle speed region phase compensation calculation result T3.

The first vehicle speed region phase compensation calculation unit 41, the second vehicle speed region phase compensation calculation unit 42, and the third vehicle speed region phase compensation calculation unit 43 execute phase compensation calculation based on respective phase compensation characteristics in all the vehicle speed regions irrespective of the vehicle speed.

A phase compensation characteristic determination unit 44 determines the phase compensation characteristic from FIG. 2A based on the vehicle speed signal V from the vehicle speed sensor 2, and outputs the phase compensation characteristic as a characteristic determination result P, namely, the first characteristic, the second characteristic, or the third characteristic.

A selection unit 45 selects the phase-compensated torque signal To from among the phase compensation calculation results T1, T2, and T3 based on the phase compensation calculation results T1, T2, and T3 output from the respective phase compensation calculation units 41, 42, and 43, the characteristic determination result P output from the phase compensation characteristic determination unit 44, and a selected characteristic Po output by the selection unit 45 in the previous processing, and outputs the phase-compensated torque signal To. Further, the phase compensation characteristic (first characteristic, second characteristic, or third characteristic) of the phase compensation calculation result selected as the phase-compensated torque signal To is output as the selected characteristic Po of the current processing.

Figure 4:
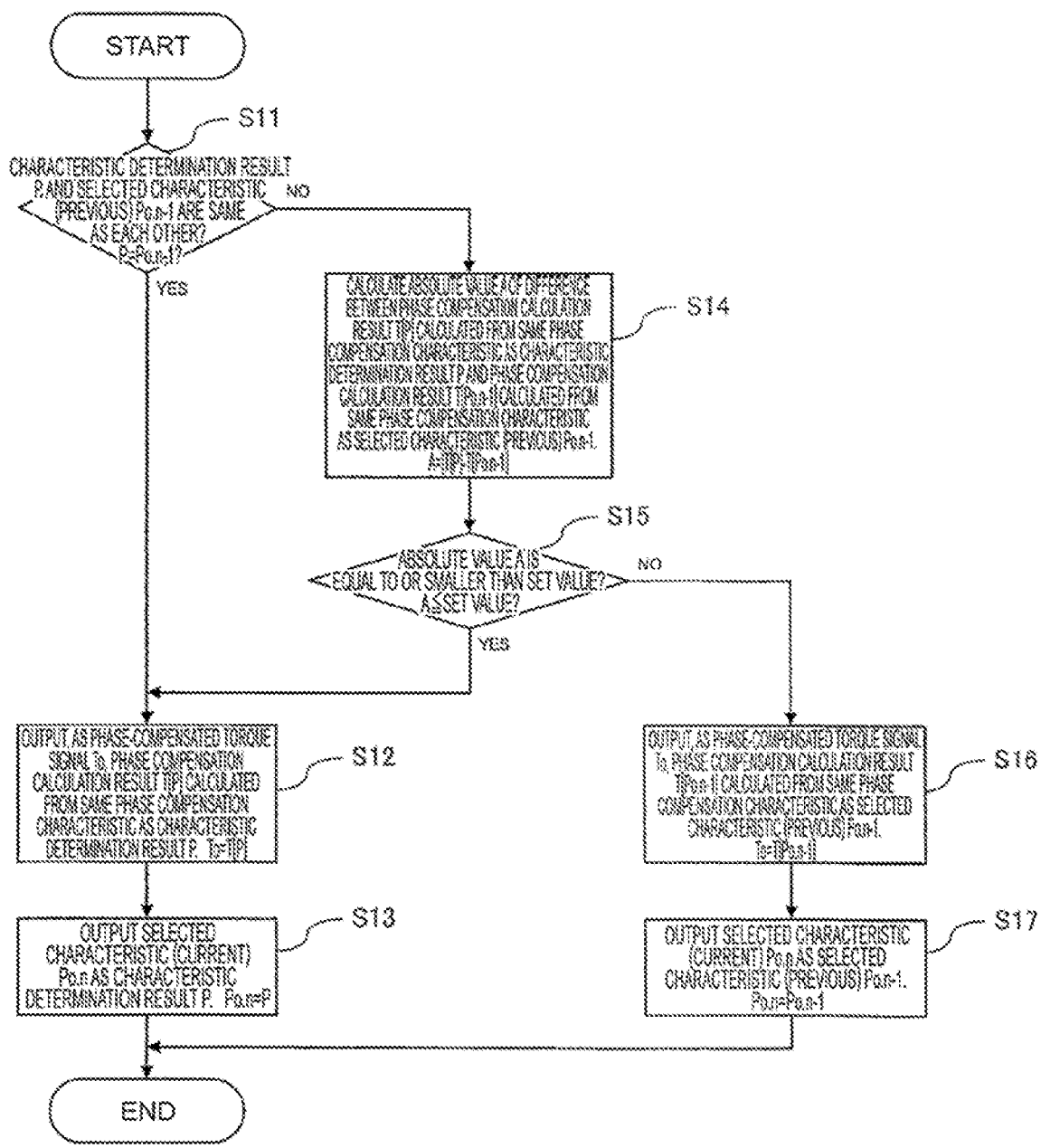
FIG. 4 is a flow chart for illustrating an example of an operation of a selection unit in the first embodiment of the present invention.

Now, a description is given of an operation of the selection unit 45 with reference to FIG. 4. FIG. 4 is a flow chart for illustrating an example of the operation of the selection unit 45.

Now, in terms of description, the selected characteristic output in the current processing (hereinafter referred to as "selected characteristic (current)") and the selected characteristic of the previous processing (hereinafter referred to as "selected characteristic (previous)") are denoted by reference symbols "Po.n" and "Po.n−1", respectively, in order to distinguish between "previous" and "current" of the selected characteristic Po. The selection unit 45 stores the selected characteristic Po while at the same time updating the selected characteristic Po in the memory M.

In Step S11, the selection unit 45 determines whether the characteristic determination result P and the selected characteristic (previous) Po.n−1 are the same as each other. When the determination result is "same" (YES), the processing proceeds to Step S12, while when the determination result is "not same" (NO), the processing proceeds to Step S14.

Now, a description is given of a case in which the determination result of Step S11 is "not same" (NO).

In Step S14, the selection unit 45 calculates an absolute value (hereinafter denoted by reference symbol "A") of a difference between the phase compensation calculation result (hereinafter denoted by reference symbol "T[P]") calculated from the same phase compensation characteristic as the characteristic determination result P and the phase compensation calculation result (hereinafter denoted by reference symbol "T[Po.n−1]") calculated from the same phase compensation characteristic as the selected characteristic (previous) Po.n−1.

That is, the absolute value A is "A=|T[P]−T[Po.n−1]|".

In Step S15, the selection unit 45 determines whether the absolute value A falls within an allowable range equal to or smaller than a predetermined value. When the absolute value A is equal to or smaller than the predetermined value, namely, "A≤predetermined value" (YES), as the determination result, the selection unit 45 proceeds to Step S12. When the absolute value A is larger than the predetermined value "A>predetermined value" (NO) as the determination result, the selection unit 45 proceeds to Step S16.

Now, a description is given of a case in which the determination result of Step S11 is "same" (YES) and a case in which the determination result of Step S15 satisfies "A≤predetermined value" (YES). In both cases, the processing proceeds to Step S12.

In Step S12, the selection unit 45 outputs, as the phase-compensated torque signal To, the phase compensation calculation result T[P] calculated from the same phase compensation characteristic as the characteristic determination result P.

That is, the output is performed so as to satisfy "To=T[P]".

In Step S13, the selection unit 45 outputs the selected characteristic (current) Po.n as the characteristic determination result P.

That is, the output is performed so as to satisfy "Po.n=P".

Now, a description is given of a case in which the absolute value A is larger than the predetermined value "A>predetermined value" (NO) as the determination result of Step S15.

In Step S16, the selection unit 45 outputs, as the phase-compensated torque signal To, the phase compensation calculation result T[Po.n−1] calculated from the same phase compensation characteristic as the selected characteristic (previous) Po.n−1.

That is, the output is performed so as to satisfy "To=T[Po.n−1]".

In Step S17, the selection unit 45 outputs the selected characteristic (current) Po.n as the selected characteristic (previous) Po.n−1.

That is, the output is performed so as to satisfy "Po.n=Po.n−1".

In Step S15, the predetermined value used for determination is a determination value for selecting the phase compensation calculation result. This predetermined value is a value enabling determination that a difference between the phase compensation calculation result T[P] calculated from the same phase compensation characteristic as the characteristic determination result P and the phase compensation calculation result T[Po.n−1] calculated from the same phase compensation characteristic as the selected characteristic (previous) Po.n−1 is small enough not to influence the behavior of the steering wheel SW.

In Step S15, when the absolute value A is determined to be equal to or smaller than the predetermined value, that is, when the absolute value A is determined to be small enough not to influence the behavior of the steering wheel SW, the phase compensation calculation result T[P] calculated from the same phase compensation characteristic as the characteristic determination result P is selected. In this case, the phase compensation characteristic is changed.

Alternatively, in Step S15, when the absolute value A is determined to be larger than the predetermined value, the phase compensation calculation result T[Po.n−1] calculated from the same phase compensation characteristic as the selected characteristic (previous) Po.n−1 is selected. In this case, the phase compensation characteristic is not changed.

With this, it is possible to change the phase compensation characteristic while at the same time suppressing deterioration in stability of the steering system.

Further, an initial value of the selected characteristic Po, namely, an initial value of the selected characteristic (previous) Po.n−1 is set to be the first characteristic indicating a state in which the vehicle speed is zero, that is, the vehicle is stopped.

Now, a description is given of an example of the operation of the selection unit 45.

For example, the case of P=third characteristic and Po.n−1=third characteristic is described.

The third vehicle speed region phase compensation calculation result T3 is output as the phase-compensated torque signal To. That is, the output is performed so as to satisfy To=T3.

Then, the selected characteristic (current) Po.n is output as a characteristic selection result P. That is, the output is performed so as to satisfy Po.n=third characteristic.

Next, the case of P=second characteristic and Po.n−1=third characteristic is described.

An absolute value "|T2-T3|" of a difference between the second vehicle speed region phase compensation calculation result T2 and the third vehicle speed region phase compensation calculation result T3 is calculated.

When the absolute value is equal to or smaller than a predetermined value, namely, "|T2-T3|≤predetermined value", the second vehicle speed region phase compensation calculation result T2 is output as the phase-compensated torque signal To. That is, the output is performed so as to satisfy To=T2. Then, the selected characteristic (current) Po.n is output as the characteristic selection result P. That is, the output is performed so as to satisfy Po.n=second characteristic. In this case, the phase compensation characteristic is changed.

When the absolute value is larger than the predetermined value, namely, "|T2-T3|> predetermined value", the third vehicle speed region phase compensation calculation result T3 is output as the phase-compensated torque signal To. That is, the output is performed so as to satisfy To=T3. Then, the selected characteristic (current) Po.n is output as the selected characteristic (previous) Po.n−1. That is, the output is performed so as to satisfy Po.n=third characteristic. In this case, the phase compensation characteristic is not changed.

As described above, according to the first embodiment, the following effect can be obtained.

The phase compensation calculation unit outputs the current phase compensation calculation result based on the current input value and the previous phase compensation calculation result. When the parameter value (phase compensation characteristic) to be applied to phase compensation calculation is switched in accordance with the vehicle speed, an influence of the phase compensation calculation result before the parameter value is switched is given, and the expected phase compensation calculation result cannot be obtained. This results in a problem in that the behavior of the steering wheel is influenced. That is, the influence of the steering wheel due to the change of the parameter value is so large that steering feeling of the steering wheel is greatly changed, or further, vibration is caused in the steering wheel.

According to the first embodiment, as in the phase compensation unit of the first embodiment illustrated in FIG. 3, the plurality of phase compensation calculation units having different phase compensation characteristics execute phase compensation calculation based on the respective phase compensation characteristics irrespective of the vehicle speed, to thereby be able to obtain the phase compensation calculation result corresponding to each phase compensation characteristic.

Then, when the difference between the previous phase compensation calculation result and the current phase compensation calculation result is equal to or smaller than a set value, and the difference is determined to be small enough not to influence the behavior of the steering wheel, the selection unit outputs, as the phase-compensated torque signal, the phase compensation calculation result corresponding to the phase compensation characteristic determined based on the vehicle speed signal. With this, it is possible to suppress variation in phase-compensated torque in a case where the phase compensation characteristic is changed, and suppress an adverse effect on the behavior of the steering wheel.

In this manner, it is possible to provide the phase compensation unit having a phase compensation characteristic, which is appropriate in accordance with the vehicle speed, and suppress deterioration in stability of the steering system, which occurs due to the change of the phase compensation characteristic, even when the phase compensation characteristic is changed.

In the description of the first embodiment, the phase compensation characteristic is changed by changing the parameter value to be used for the same phase compensation calculation. In the first embodiment, the phase compensation calculation method may be changed based on the vehicle speed.

In this manner, it is also possible to apply the phase compensation characteristic, which is appropriate in accordance with the vehicle speed, irrespective of the phase compensation characteristics of the previous and subsequent vehicle speed regions by changing the phase compensation calculation method instead of changing the parameter value to be used for phase compensation calculation.

Second Embodiment

Figure 5:
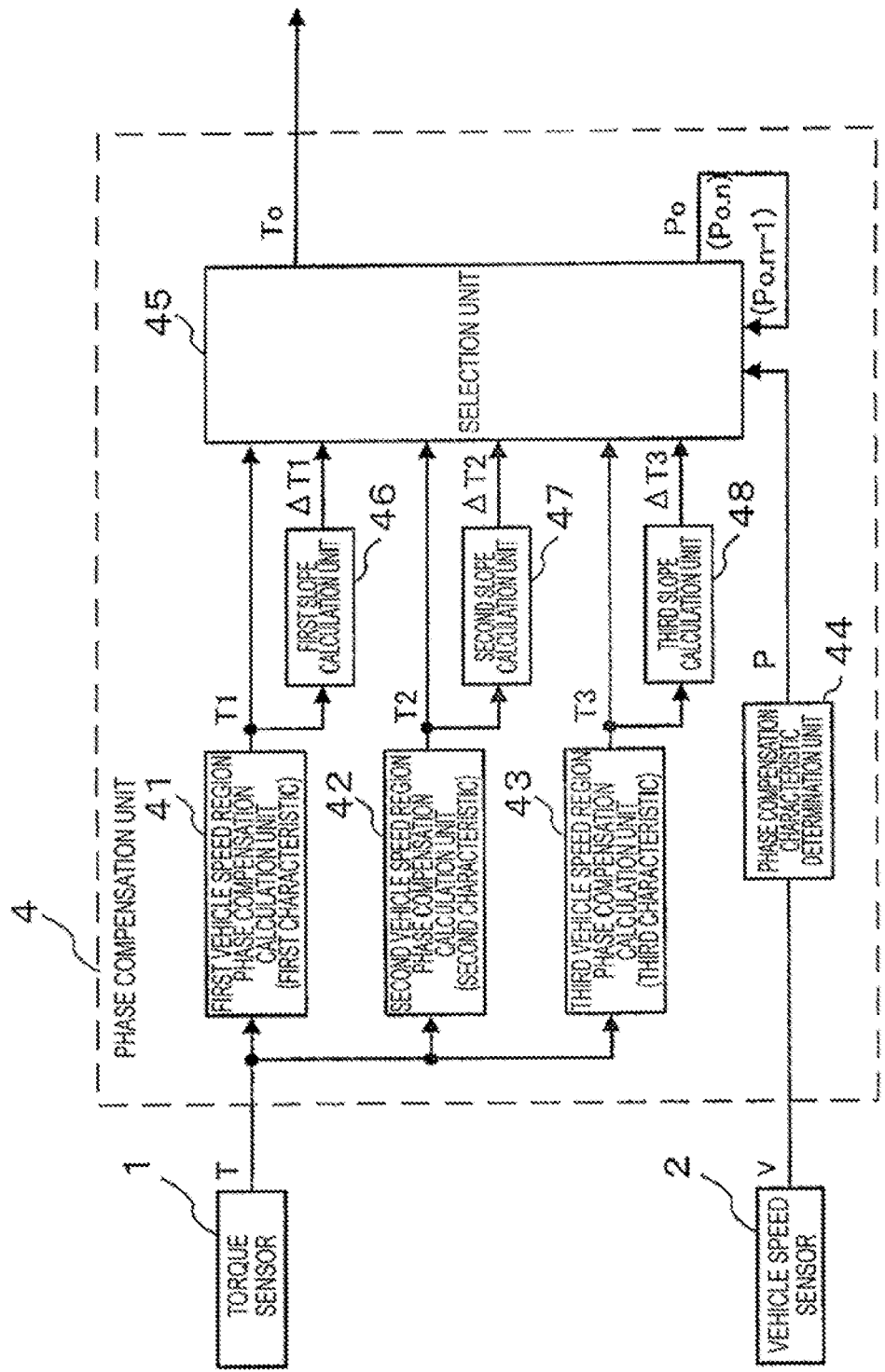
FIG. 5 is a functional block diagram for illustrating an example of a configuration of a phase compensation unit of an electric power steering device according to a second embodiment of the present invention.

FIG. 5 is a functional block diagram for illustrating an example of a configuration of a phase compensation unit of an electric power steering device according to a second embodiment of the present invention. The second embodiment of the present invention is different from the first embodiment in the configuration of the phase compensation unit 4 and in the operation of the selection unit 45.

Now, a description is given of a configuration of the phase compensation unit 4 in the second embodiment with reference to FIG. 5. The configuration of the phase compensation unit 4 is different from the configuration in the first embodiment of FIG. 3 in a first slope calculation unit 46, a second slope calculation unit 47, and a third slope calculation unit 48. Now, a description is given of the slope calculation units 46, 47, and 48.

The slope calculation units 46, 47, and 48 differentiate the phase compensation calculation results T1, T2, and T3, which are output from the phase compensation calculation units 41, 42, and 43, with respect to time, and output slopes ΔT1, ΔT2, and ΔT3, respectively. The slopes ΔT1, ΔT2, and ΔT3 are input to the selection unit 45.

The first slope calculation unit 46 differentiates the first vehicle speed region phase compensation calculation result T1 output from the first vehicle speed region phase compensation calculation unit 41 with respect to time, and outputs the first slope ΔT1.

The second slope calculation unit 47 differentiates the second vehicle speed region phase compensation calculation result T2 output from the second vehicle speed region phase compensation calculation unit 42 with respect to time, and outputs the second slope ΔT2.

The third slope calculation unit 48 differentiates the third vehicle speed region phase compensation calculation result T3 output from the third vehicle speed region phase compensation calculation unit 43 with respect to time, and outputs the third slope ΔT3.

The first slope ΔT1, the second slope ΔT2, and the third slope ΔT3 are input to the selection unit 45.

Figure 6:
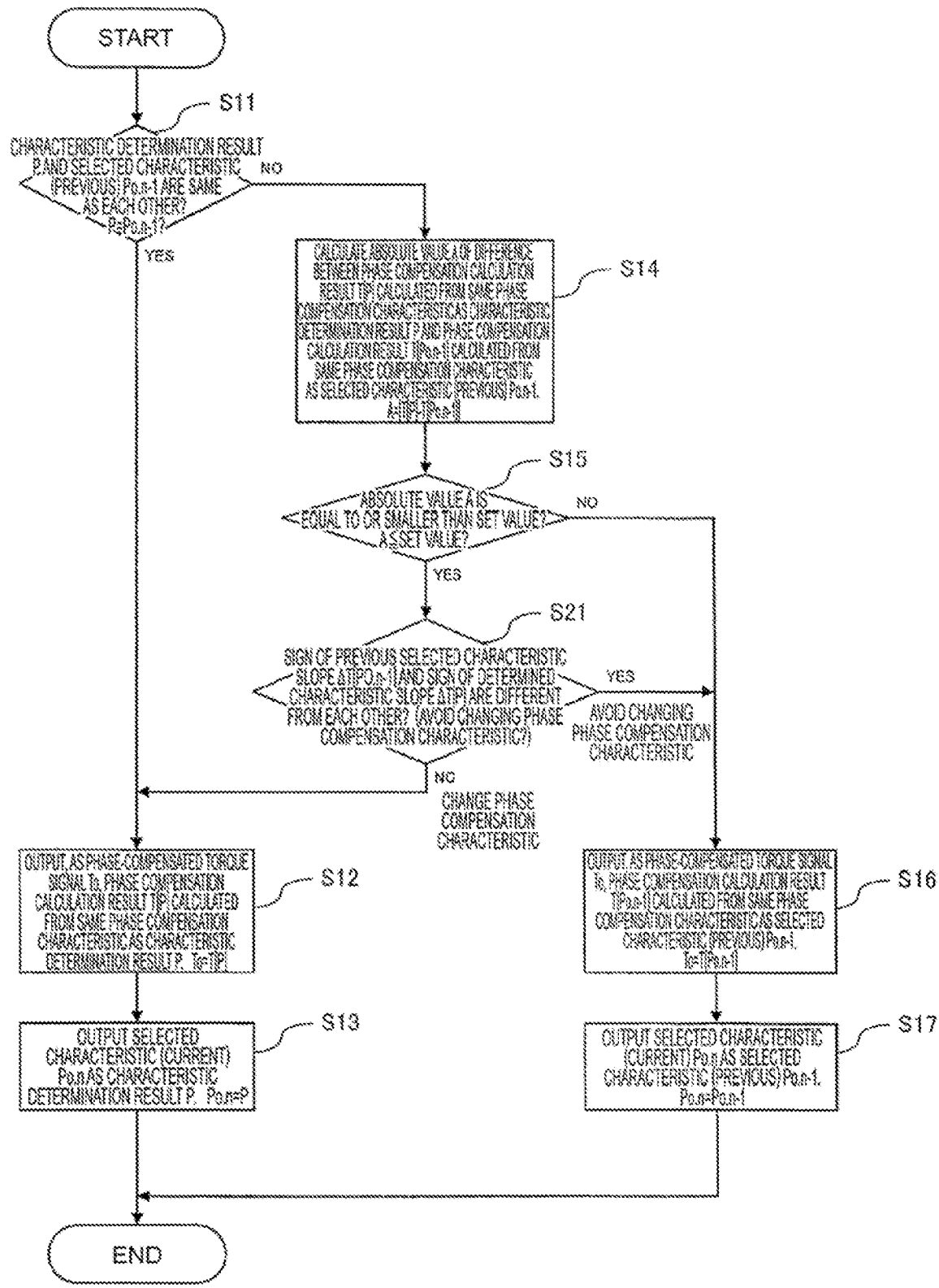
FIG. 6 is a flow chart for illustrating an example of an operation of a selection unit in the second embodiment of the present invention.

Next, a description is given of the operation of the selection unit 45 in the second embodiment with reference to FIG. 6. FIG. 6 is a flow chart for illustrating an example of the operation of the selection unit 45.

The operation of the selection unit 45 is different from that of the first embodiment of FIG. 4 in Step S21. Now, Step S21 is described.

In Step S21, when it is determined that change of the phase compensation characteristic causes the phase-compensated torque signal To to switch from increase to decrease or from decrease to increase, the selection unit 45 does not change the phase compensation characteristic. In actuality, the selection unit 45 does not switch between the phase compensation calculation results T1 to T3 (the same holds true below). The selection unit 45 makes a determination based on the slope of the phase compensation calculation result calculated from the same phase compensation characteristic as the selected characteristic (previous) Po.n−1 and the slope of the phase compensation calculation result calculated from the same phase compensation characteristic as the characteristic determination result P.

The slope of the phase compensation calculation result calculated from the same phase compensation characteristic as the selected characteristic (previous) Po.n−1 is hereinafter referred to as "previous selected characteristic slope", and is denoted by reference symbol ΔT[Po.n−1]. The slope of the phase compensation calculation result calculated from the same phase compensation characteristic as the characteristic determination result P is referred to as "determined characteristic slope", and is denoted by reference symbol ΔT[P].

In Step S21, when the sign (+/−) of the previous selected characteristic slope ΔT[Po.n−1] and the sign (+/−) of the determined characteristic slope ΔT[P] are different from each other (YES), the selection unit 45 proceeds to Step S16. The selection unit 45 does not change the phase compensation characteristic. When the sign (+/−) of the previous selected characteristic slope ΔT[Po.n−1] and the sign (+/−) of the determined characteristic slope ΔT[P] are the same as each other (NO), the selection unit 45 proceeds to Step S12. The selection unit 45 changes the phase compensation characteristic.

A specific determination method of Step S21 is shown in FIG. 7.

As indicated by No. 2 and No. 4, when the sign of the previous selected characteristic slope ΔT[Po.n−1] and the sign of the determined characteristic slope ΔT[P] are different from each other, the determination result is "YES", and the phase compensation characteristic is not changed.

As indicated by No. 1 and No. 5, when the sign of the previous selected characteristic slope ΔT[Po.n−1] and the sign of the determined characteristic slope ΔT[P] are the same as each other, the determination result is "NO", and the phase compensation characteristic is changed.

As indicated by No. 3, No. 6, No. 7, No. 8, and No. 9, when any one of the slopes is zero or both of the slopes are zero, the determination result is "NO", and the phase compensation characteristic is changed.

The term "zero" may refer to a value having a set range around zero in which the slope is considered to be substantially zero.

As described above, according to the second embodiment, there is provided an effect of suppressing deterioration in stability of the steering system due to change of the phase compensation characteristic by changing the phase compensation characteristic to be applied to the phase compensation unit when the sign of the previous selected characteristic slope ΔT[Po.n−1] and the sign of the determined characteristic slope ΔT[P] are the same as each other.

Third Embodiment

Figure 8:
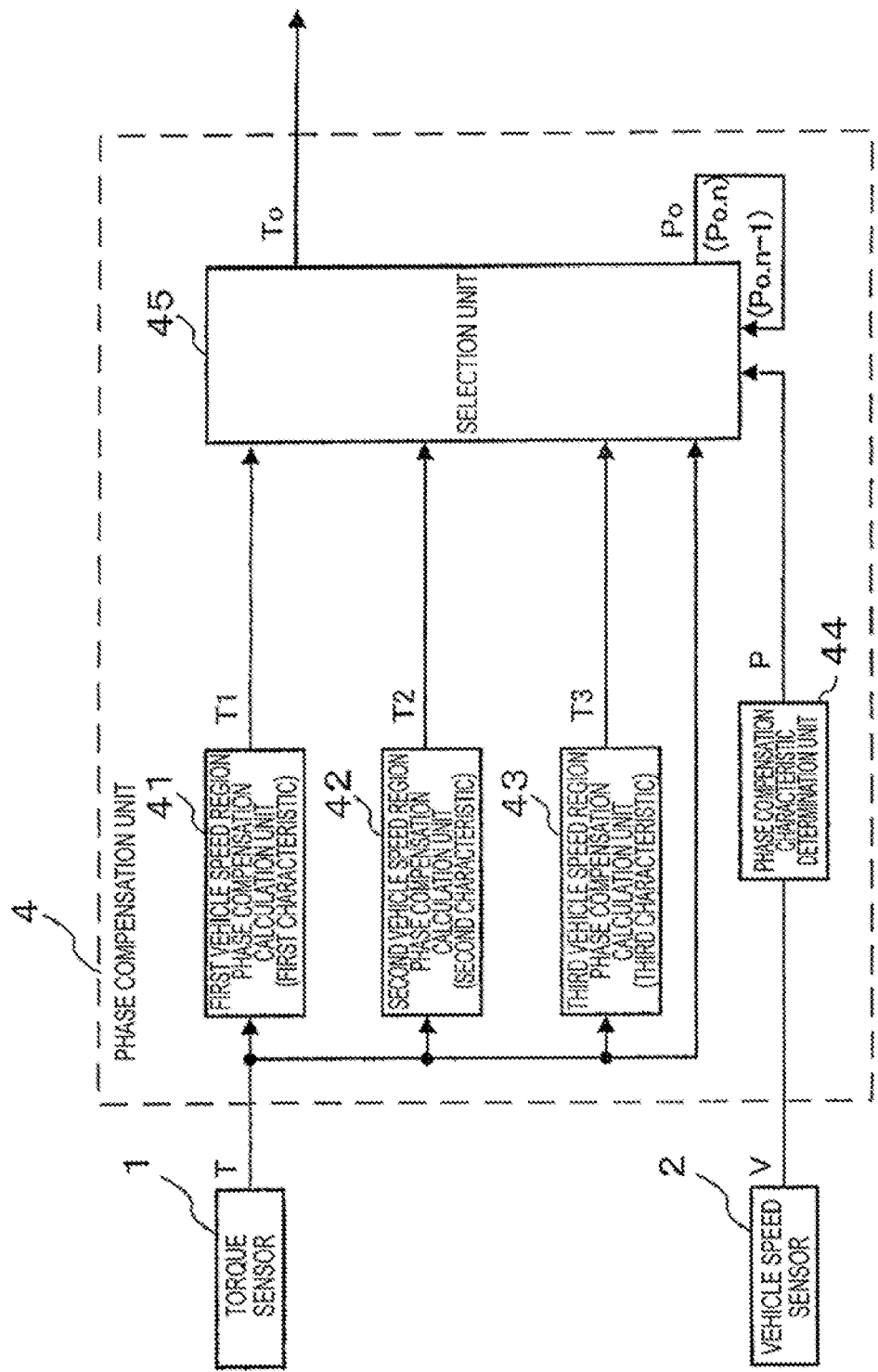
FIG. 8 is a functional block diagram for illustrating an example of a configuration of a phase compensation unit of an electric power steering device according to a third embodiment of the present invention.

FIG. 8 is a functional block diagram for illustrating an example of a configuration of a phase compensation unit of an electric power steering device according to a third embodiment of the present invention. The third embodiment of the present invention is different from the first embodiment in the configuration of the phase compensation unit 4 and in the operation of the selection unit 45.

Now, a description is given of a configuration of the phase compensation unit 4 in the third embodiment with reference to FIG. 8. The configuration of the phase compensation unit 4 is different from that of the first embodiment of FIG. 3 in that the torque signal T output from the torque sensor 1 is also input to the selection unit 45.

Figure 9:
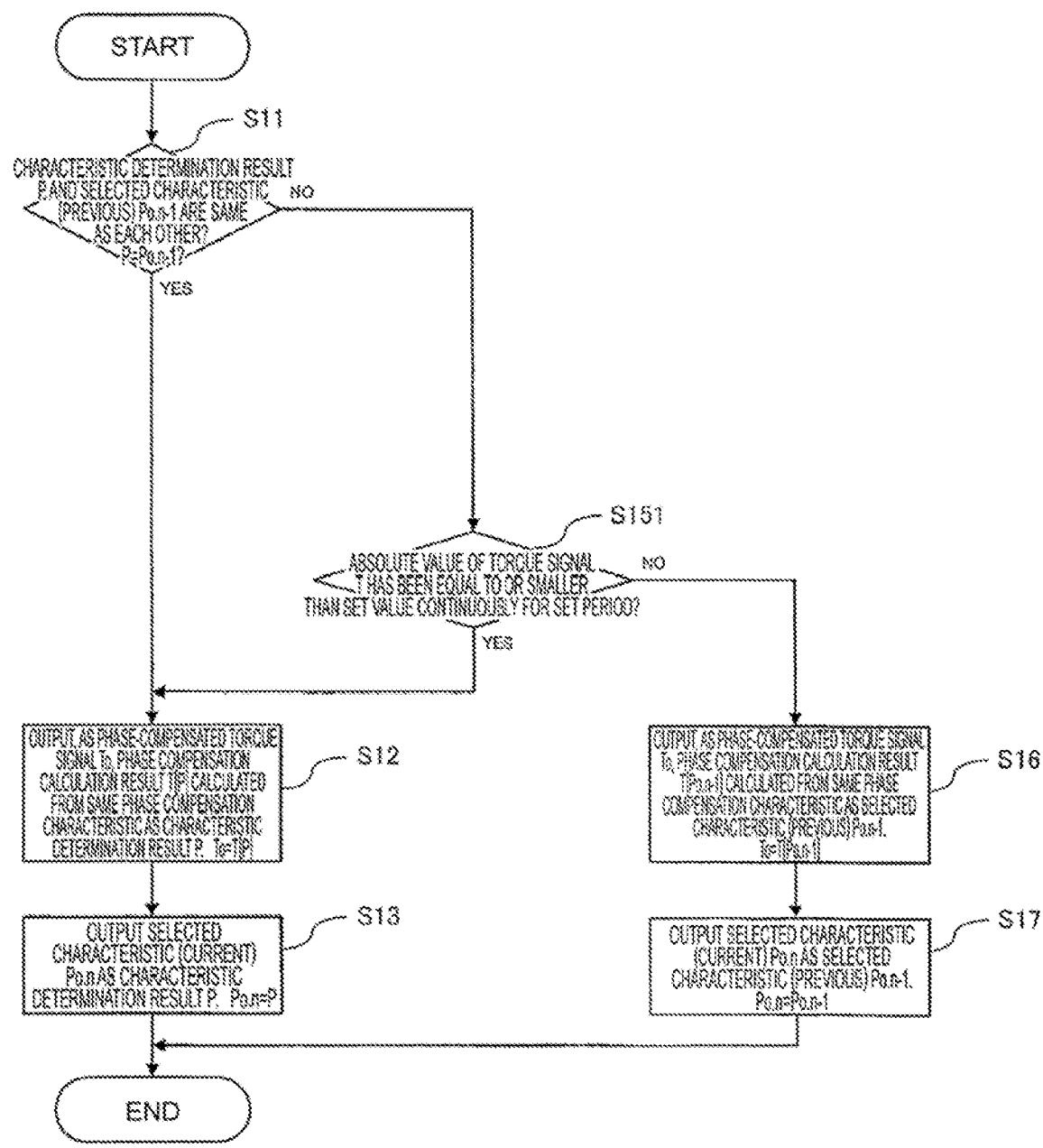
FIG. 9 is a flow chart for illustrating an example of an operation of a selection unit in the third embodiment of the present invention.

Next, a description is given of the operation of the selection unit 45 in the third embodiment with reference to FIG. 9. FIG. 9 is a flow chart for illustrating an example of the operation of the selection unit 45.

The operation of the selection unit 45 is different from that of the first embodiment in that Step S14 and Step S15 of FIG. 4 of the first embodiment are omitted, and Step S151 is provided. Step S14 and Step S15 are replaced with Step S151. Now, a description is given of Step S151.

In the first embodiment, in Step S15, when the absolute value of the difference between phase compensation calculation results is equal to or smaller than the set value, the phase compensation characteristic is changed. This is because the phase compensation calculation result is different due to the difference of the phase compensation characteristic.

However, when even different phase compensation characteristics exhibit substantially the same characteristic in a specific frequency region, the phase compensation calculation results also become substantially the same in that specific frequency region. Thus, in the third embodiment, when the respective phase compensation characteristics exhibit substantially the same characteristic in a specific frequency region, the phase compensation characteristic is changed in that specific frequency region.

Specifically, when the respective phase compensation characteristics exhibit substantially the same characteristic in a low frequency region like steering by the driver, which can be determined from the torque signal T, the phase compensation characteristic is changed in that frequency region.

In Step S151, only when the frequency of the torque signal T is determined to be low based on the torque signal T, that is, determined to be in a frequency region in which the respective phase compensation characteristics exhibit substantially the same characteristic, the phase compensation characteristic is changed.

The selection unit 45 determines whether the absolute value of the torque signal T has been equal to or smaller than the set value continuously for a set period defined in advance. When the condition of "the absolute value of the torque signal T has been equal to or smaller than the set value continuously for a set period" is satisfied as the determination result (YES), the selection unit 45 proceeds to Step S12, and changes the phase compensation characteristic. Otherwise (NO), that is, when the condition of "the absolute value of the torque signal T has been equal to or smaller than the set value continuously for a set period" is not satisfied, the selection unit 45 proceeds to Step S16, and does not change the phase compensation characteristic.

As described above, according to the third embodiment, there is provided an effect of suppressing deterioration in stability of the steering system due to change of the phase compensation characteristic even when the phase compensation characteristic to be applied to the phase compensation unit is changed in accordance with the vehicle speed in a case where the absolute value of the torque signal T, which indicates a low frequency region like steering by the driver, has been equal to or smaller than the set value continuously for a set period.

The third embodiment may be implemented in combination with the first embodiment or the second embodiment.

Fourth Embodiment

Figure 10:
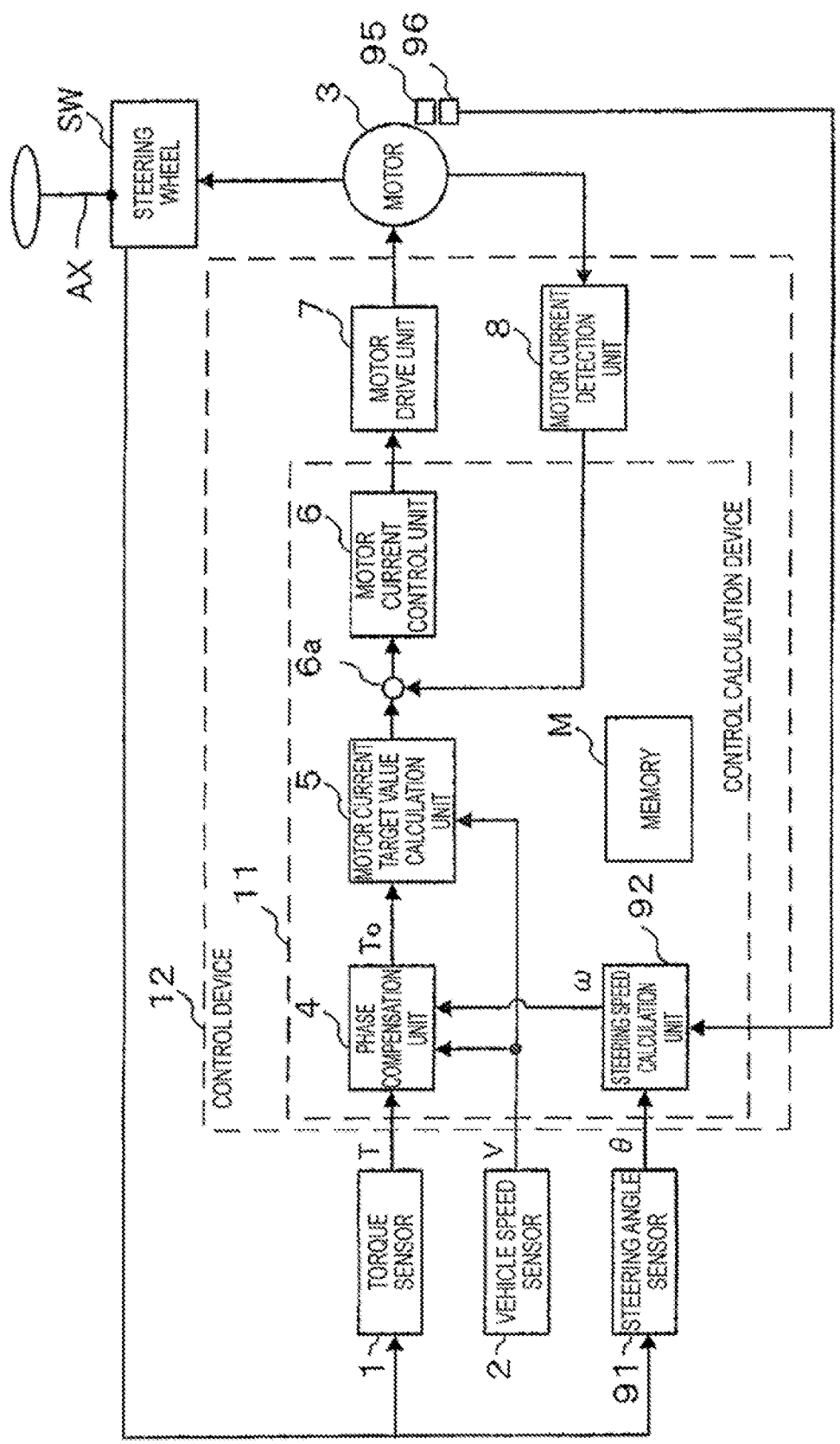
FIG. 10 is a functional block diagram for illustrating a configuration of an electric power steering device according to a fourth embodiment of the present invention.
Figure 11:
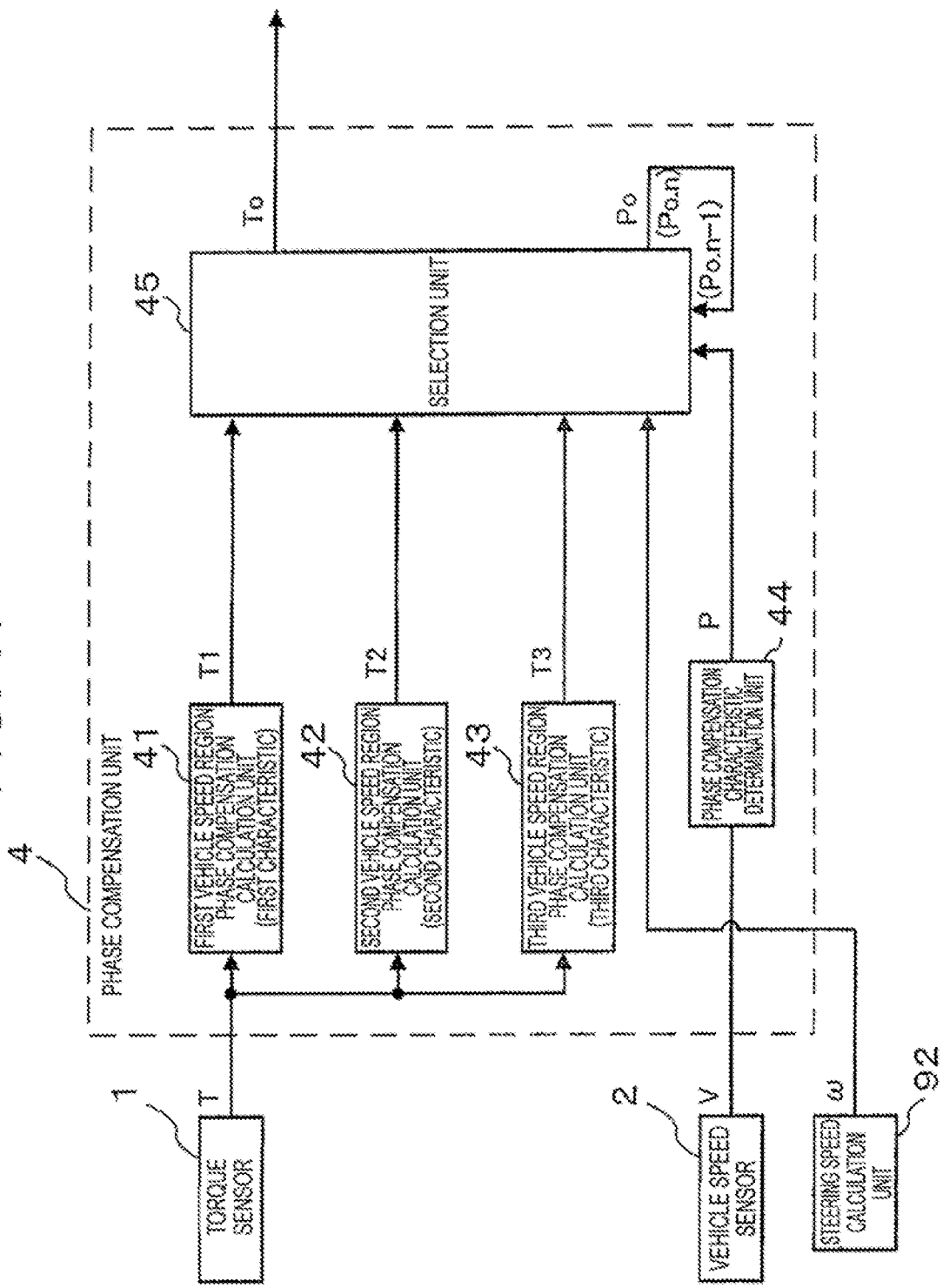
FIG. 11 is a functional block diagram for illustrating an example of a configuration of a phase compensation unit in the fourth embodiment of the present invention.

FIG. 10 is a functional block diagram for illustrating a configuration of an electric power steering device according to a fourth embodiment of the present invention. FIG. 11 is a functional block diagram for illustrating an example of a configuration of the phase compensation unit 4 of FIG. 10 in the fourth embodiment of the present invention.

The fourth embodiment of the present invention is different from the first embodiment in the configuration of the electric power steering device, the configuration of the phase compensation unit 4, and the operation of the selection unit 45. Now, a description is given of the configuration of the electric power steering device, the configuration of the phase compensation unit 4, and the operation of the selection unit 45 in the fourth embodiment.

Now, a description is given of the configuration of the electric power steering device according to the fourth embodiment with reference to FIG. 10. The electric power steering device includes a steering angle sensor 91 and a steering speed calculation unit 92 unlike in the first embodiment of FIG. 1. Now, a description is given of the steering angle sensor 91 and the steering speed calculation unit 92.

The steering angle sensor 91 outputs a steering angle θ indicating a rotation angle of the steering wheel SW to the steering speed calculation unit 92. The steering speed calculation unit 92 calculates and outputs a steering speed ω indicating a rotation speed of the steering wheel SW based on the steering angle θ. The steering speed ω is calculated by differentiating the steering angle θ with respect to time. The steering speed ω is input to the phase compensation unit 4.

The steering speed calculation unit 92 calculates the steering speed ω based on the steering angle θ. However, when the motor includes a motor rotation angle sensor 95 or a motor rotation angle speed sensor 96, the steering speed calculation unit 92 may calculate the steering speed ω based on the motor rotation angle or the motor rotation speed output from the motor rotation angle sensor 95 or the motor rotation angle speed sensor 96.

Further, although the steering speed ω is output from the steering speed calculation unit 92, the steering angle sensor 91 may be a steering angle speed sensor. In this case, the steering speed calculation unit 92 is not required, and the phase compensation unit 4 may directly use the steering speed ω output from the steering angle speed sensor.

Next, a description is given of the configuration of the phase compensation unit 4 in the fourth embodiment with reference to FIG. 11. The configuration of the phase compensation unit 4 is different from that of the first embodiment of FIG. 3 in that the steering speed ω output from the steering speed calculation unit 92 is input to the selection unit 45.

Figure 12:
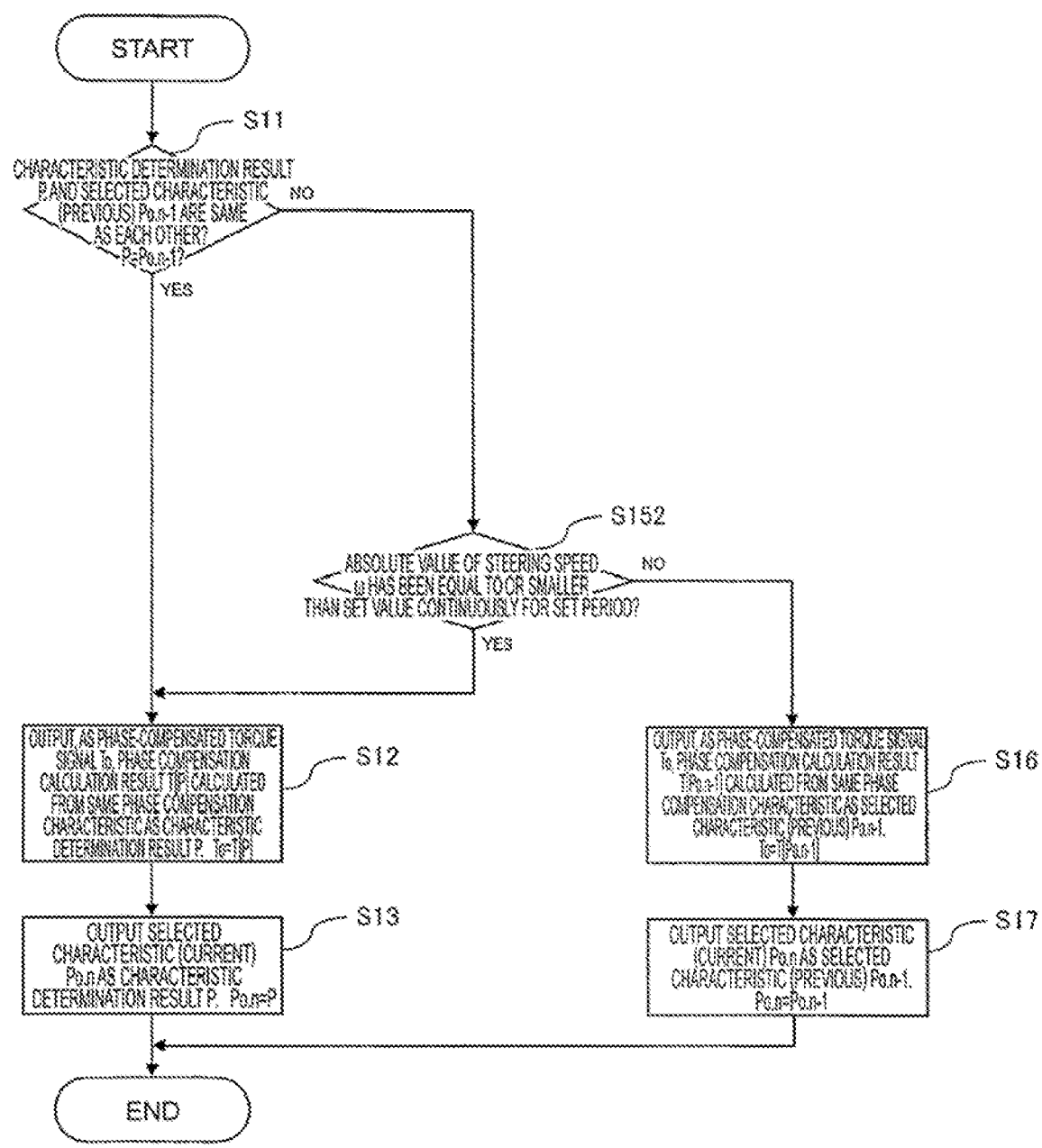
FIG. 12 is a flow chart for illustrating an example of an operation of a selection unit in the fourth embodiment of the present invention.

Next, a description is given of the operation of the selection unit 45 in the fourth embodiment with reference to FIG. 12. FIG. 12 is a flow chart for illustrating an example of the operation of the selection unit 45.

The operation of the selection unit 45 is different from that of the first embodiment of FIG. 4 in Step S14, Step S15, and Step S152. Step S14 and Step S15 are replaced with Step S152. Now, a description is given of Step S152.

In the first embodiment, in Step S15, when the absolute value of the difference between phase compensation calculation results is equal to or smaller than the set value, the selection unit 45 changes the phase compensation characteristic. This is because the phase compensation calculation result is different due to the difference of the phase compensation characteristic.

However, when even different phase compensation characteristics exhibit substantially the same characteristic in a specific frequency region, the phase compensation calculation results also become substantially the same in that specific frequency region. As a result, in the fourth embodiment, when the respective phase compensation characteristics exhibit substantially the same characteristic in a specific frequency region, the phase compensation characteristic is changed in that specific frequency region.

Specifically, when the respective phase compensation characteristics exhibit substantially the same characteristic in a low frequency region like steering by the driver, which can be determined from the steering speed ω, the phase compensation characteristic is changed in that frequency region.

In Step S152, only when the frequency of the torque signal T is determined to be low based on the steering speed ω, that is, determined to be in a frequency region in which the respective phase compensation characteristics exhibit substantially the same characteristic, the phase compensation characteristic is changed.

The selection unit 45 determines whether the absolute value of the steering speed ω has been equal to or smaller than the set value continuously for a set period defined in advance. When the condition of "the absolute value of the steering speed ω has been equal to or smaller than the set value continuously for a set period" is satisfied (YES), the selection unit 45 proceeds to Step S12, and changes the phase compensation characteristic. Otherwise (NO), that is, when the condition of "the absolute value of the steering speed ω has been equal to or smaller than the set value continuously for a set period" is not satisfied, the selection unit 45 proceeds to Step S16, and does not change the phase compensation characteristic.

As described above, according to the fourth embodiment, there is provided an effect of suppressing deterioration in stability of the steering system due to change of the phase compensation characteristic even when the phase compensation characteristic to be applied to the phase compensation unit is changed in accordance with the vehicle speed in a case where the absolute value of the steering speed ω, which indicates a low frequency region like steering by the driver, has been equal to or smaller than the set value continuously for a set period.

The fourth embodiment may be implemented in combination with the first embodiment or the second embodiment.

Further, in each embodiment, a section formed of the control calculation device 11 can be constructed by a computer or a digital circuit.

Regarding this point, each of the processing circuits for implementing those functions in the control calculation device 11 may be constructed by dedicated hardware or a central processing unit (CPU, which is also referred to as "processing unit", "arithmetic unit", "microprocessor", "microcomputer", "processor", or "DSP") for executing a program stored in a memory.

Figure 13:
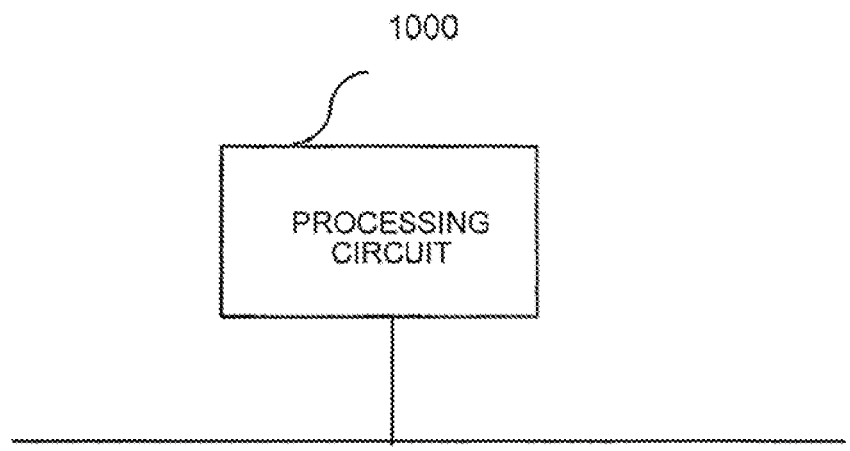
FIG. 13 is a diagram for illustrating an example of a hardware configuration in a case where a section formed of a control calculation device of the electric power steering device according to each of embodiments of the present invention is constructed by hardware.
Figure 14:
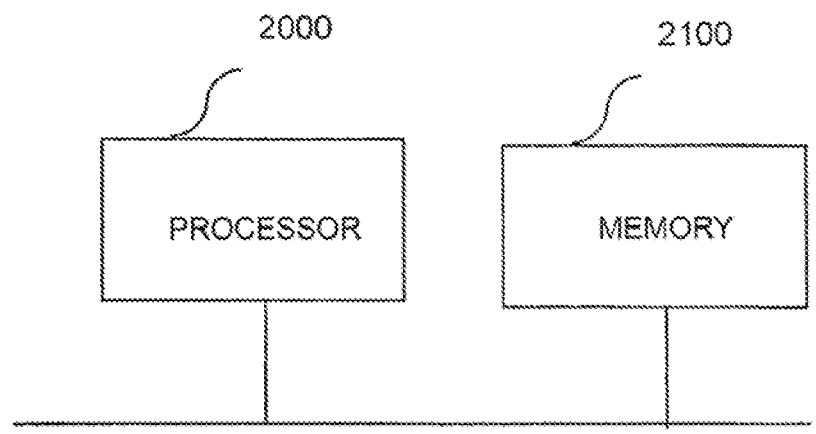
FIG. 14 is a diagram for illustrating an example of a hardware configuration in a case where the section formed of the control calculation device of the electric power steering device according to each of the embodiments of the present invention is constructed by software.

FIG. 13 and FIG. 14 are diagrams for schematically illustrating hardware configurations in a case where those functions are constructed by hardware and a case where those functions are constructed by software, respectively. When the functions of the above-mentioned respective components are constructed by hardware illustrated in FIG. 13, a processing circuit 1000 corresponds to, for example, a single circuit, a complex circuit, a programmed processor, a processor for a parallel program, an ASIC, an FPGA, or a combination thereof. The function of each component described above may be implemented by a processing circuit, or the functions of the respective components may altogether be implemented by a processing circuit.

When the functions of the above-mentioned respective components are constructed by a CPU illustrated in FIG. 14, the functions of the respective components are implemented by software, firmware, or a combination of software and firmware. The software and the firmware are described as programs, and are stored in a memory 2100. A processor 2000, which is a processing circuit, reads out and executes the programs stored in the memory 2100, to thereby implement the functions of the respective components.

Those programs may be considered as programs for causing a computer to execute the procedures and the methods of the respective components. In this case, the memory 2100 corresponds to, for example, a nonvolatile or volatile semiconductor memory such as a RAM, a ROM, a flash memory, an EPROM, or an EEPROM, or to a magnetic disk, a flexible disk, an optical disc, a compact disc, a MiniDisc, or a DVD.

The functions of the respective components may be implemented partially by dedicated hardware, and partially by software or firmware.

In this manner, the processing circuit can implement each of the above-mentioned functions by hardware, software, firmware, or a combination thereof. Moreover, various types of information required for the processing are set to the circuit in advance in the case of the hardware configuration, and are stored in the memory in advance in the case of the software configuration.

REFERENCE SIGNS LIST 1 torque sensor, 2 vehicle speed sensor, 3 motor, 4 phase compensation unit, 5 motor current target value calculation unit, 6 motor current control unit, 6a comparator, 7 motor drive unit, 8 motor current detection unit, 11 control calculation device, 12 control device, 41 first vehicle speed region phase compensation calculation unit (phase compensation calculation unit), 42 second vehicle speed region phase compensation calculation unit (phase compensation calculation unit), 43 third vehicle speed region phase compensation calculation unit (phase compensation calculation unit), 44 phase compensation characteristic determination unit, 45 selection unit, 46 first slope calculation unit (slope calculation unit), 47 second slope calculation unit (slope calculation unit), 48 third slope calculation unit (slope calculation unit), 91 steering angle sensor, 92 steering speed calculation unit, 95 motor rotation angle sensor, 96 motor rotation angle speed sensor, 1000 processing circuit, 2000 processor, M, 2100 memory, SW steering wheel.

The invention claimed is:
1. An electric power steering device, comprising:
a torque sensor to detect a steering torque added to a steering system of a vehicle by a driver, and output a torque signal;
a vehicle speed sensor to detect a vehicle speed of the vehicle, and output a vehicle speed signal;
a motor, which is coupled to the steering system, and to generate an assist torque for assisting the driver in steering and add the assist torque to the steering system; and
a controller to control drive of the motor so that the motor generates the assist torque corresponding to the torque signal and the vehicle speed signal,
wherein the controller includes a phase compensator to compensate for a phase of the torque signal in accordance with the vehicle speed signal, and to generate a motor current control signal in accordance with a phase-compensated torque signal after phase compensation,
wherein the phase compensator includes:
a memory to store a plurality of phase compensation characteristics corresponding to a plurality of vehicle speed regions;
a plurality of phase compensation calculator to execute phase compensation calculation by the mutually differ- ent plurality of phase compensation characteristics for the torque signal, and to output phase compensation calculation results;

a phase compensation characteristic determiner to determine a phase compensation characteristic corresponding to a vehicle speed region including the vehicle speed signal from among the plurality of phase compensation characteristics, and to output the phase compensation characteristic as a characteristic determination result; and a selector to select, as the phase-compensated torque signal, a phase compensation calculation result corresponding to the characteristic determination result from among the phase compensation calculation results respectively calculated by the plurality of phase compensation calculator, and to output the phase compensation calculation result, and wherein the selector has at least one of:

a configuration to:

store a selected characteristic indicating a phase compensation characteristic corresponding to the previously selected phase-compensated torque signal;

select, as the phase-compensated torque signal, a phase compensation calculation result corresponding to the characteristic determination result when the characteristic determination result output by the phase compensation characteristic determiner as a current value and the selected characteristic are as the same as each other;

calculate a difference between a current phase compensation calculation result corresponding to the characteristic determination result and a current phase compensation calculation result corresponding to the selected characteristic when the characteristic determination result output by the phase compensation characteristic determiner as the current value and the selected characteristic are not the same as each other;

select, as the phase-compensated torque signal, the current phase compensation calculation result corresponding to the characteristic determination result when the difference falls within an allowable range set in advance; and select, as the phase-compensated torque signal, the current phase compensation calculation result corresponding to the selected characteristic when the difference falls outside the allowable range; or a configuration to:

store a selected characteristic indicating a phase compensation characteristic corresponding to the previously selected phase-compensated torque signal;

select, as the phase-compensated torque signal, a phase compensation calculation result corresponding to the characteristic determination result when the characteristic determination result output by the phase compensation characteristic determiner as the current value and the selected characteristic are as the same as each other;

determine whether a rotation state of the steering system falls within a low frequency region when the characteristic determination result output by the phase compensation characteristic determiner as the current value and the selected characteristic are not the same as each other;

select, as the phase-compensated torque signal, the current phase compensation calculation result corresponding to the characteristic determination result when the rotation state of the steering system falls within the low frequency region; and select, as the phase-compensated torque signal, the current phase compensation calculation result corresponding to the selected characteristic when the rotation state of the steering system does not fall within the low frequency region.

2. The electric power steering device according to claim 1, wherein the phase compensator includes a slope unit calculator in each of the plurality of phase compensation calculator, wherein the slope calculator calculates a slope, which is a time derivative of the phase compensation calculation result output from the phase compensation calculator, and output the slope to the selector, and wherein the selector selects the phase-compensated torque signal output from the phase compensator based further on the slope.

3. The electric power steering device according to claim 2, wherein the selector:

performs determination based on a sign of the slope of the current phase compensation calculation result corresponding to the characteristic determination result and a sign of the slope of the current phase compensation calculation result corresponding to the selected characteristic when the difference falls within the allowable range set in advance;

selects the current phase compensation calculation result corresponding to the selected characteristic as the phase-compensated torque signal when the signs are different from each other; and selects the current phase compensation calculation result corresponding to the characteristic determination result as the phase-compensated torque signal when the signs are as the same as each other.

4. The electric power steering device according to claim 1, wherein the unit is configured to receive selector receives input of the torque signal, and selects the phase-compensated torque signal output from the phase compensator based on the phase compensation calculation result, the characteristic determination result, and the torque signal so as to determine whether the rotation state of the steering system falls within the low frequency region.

5. The electric power steering device according to claim 4, wherein the selector, in a case where the characteristic determination result output by the phase compensation characteristic determiner as the current value and the selected characteristic are not the same as each other:

selects the current phase compensation calculation result corresponding to the characteristic determination result as the phase-compensated torque signal when an absolute value of the torque signal has been equal to or smaller than a set value continuously for a set period; and selects the current phase compensation calculation result corresponding to the selected characteristic as the phase-compensated torque signal when the absolute value of the torque signal has not been equal to or smaller than the set value continuously for the set period.

6. The electric power steering device according to claim 1, further comprising:

a steering angle sensor to detect a steering angle of the steering system, and output a steering angle signal;

a steering speed calculator to calculate a steering speed indicating a rotation speed based on the steering angle signal, wherein the selector receives input of the steering speed, and selects the phase-compensated torque signal output from the phase compensator based on the phase compensation calculation result, the characteristic determination result, and the steering speed so as to determine whether the rotation state of the steering system falls within the low frequency region.

7. The electric power steering device according to claim 6, wherein the selector, in a case where the characteristic determination result output by the phase compensation characteristic determiner as the current value and the selected characteristic are not the same as each other:
   selects the current phase compensation calculation result corresponding to the characteristic determination result as the phase-compensated torque signal when an absolute value of the steering speed has been equal to or smaller than a set value continuously for a set period; and
   selects the current phase compensation calculation result corresponding to the selected characteristic as the phase-compensated torque signal when the absolute value of the steering speed has not been equal to or smaller than the set value continuously for the set period.

8. A method of controlling an electric power steering device comprising:
   storing, a plurality of phase compensation characteristics corresponding to a plurality of vehicle speed regions in advance;
   executing phase compensation calculation by the mutually different plurality of phase compensation characteristics for the torque signal, and outputting phase compensation calculation results;
   determining a phase compensation characteristic corresponding to a vehicle speed region including the vehicle speed signal from among the plurality of phase compensation characteristics, and outputting the phase compensation characteristic as a characteristic determination result; and
   selecting a phase compensation calculation result corresponding to the characteristic determination result from among the respective phase compensation calculation results calculated in accordance with the different plurality of phase compensation characteristics, and outputting the phase compensation calculation result as the phase-compensated torque signal,
   wherein the selecting and outputting includes:
   storing a selected characteristic indicating a phase compensation characteristic corresponding to the previously selected phase-compensated torque signal;
   selecting and outputting the phase compensation calculation result corresponding to the characteristic determination result as the phase-compensated torque signal when the characteristic determination result output as a current value in the outputting as the characteristic determination result and the selected characteristic are the same as each other;
   calculating a difference between a current phase compensation calculation result corresponding to the characteristic determination result and a current phase compensation calculation result corresponding to the selected characteristic when the characteristic determination result output as the current value in the outputting as the characteristic determination result and the selected characteristic are not the same as each other;
   selecting and outputting the current phase compensation calculation result corresponding to the characteristic determination result as the phase-compensated torque signal when the difference falls within an allowable range set in advance; and
   selecting the current phase compensation calculation result corresponding to the selected characteristic as the phase-compensated torque signal when the difference falls outside the allowable range, or
   the selecting and outputting includes:
   storing a selected characteristic indicating a phase compensation characteristic corresponding to the previously selected phase-compensated torque signal;
   selecting and outputting the phase compensation calculation result corresponding to the characteristic determination result as the phase-compensated torque signal when the characteristic determination result output as a current value in the outputting as the characteristic determination result and the selected characteristic are the same as each other;
   determining whether a rotation state of the steering system falls within a low frequency region when the characteristic determination result output as the current value in the outputting as the characteristic determination result and the selected characteristic are not the same as each other;
   selecting, as the phase-compensated torque signal, the current phase compensation calculation result corresponding to the current characteristic determination result when the rotation state of the steering system falls within the low frequency region; and
   selecting, as the phase-compensated torque signal, the current phase compensation calculation result corresponding to the selected characteristic when the rotation state of the steering system does not fall within the low frequency region.

* * * * *